US007184577B2

(12) United States Patent
Chen et al.

(10) Patent No.: US 7,184,577 B2
(45) Date of Patent: Feb. 27, 2007

(54) IMAGE INDEXING SEARCH SYSTEM AND METHOD

(75) Inventors: Tianlong Chen, Gaithersburg, MD (US); Yi Rui, Rockville, MD (US); Yingbin Wang, Rockville, MD (US); Yinong Wei, Gaithersburg, MD (US)

(73) Assignee: InteliTrac, Inc., Germantown, MD (US)

( * ) Notice: Subject to any disclaimer, the term of this patent is extended or adjusted under 35 U.S.C. 154(b) by 511 days.

(21) Appl. No.: 10/718,738

(22) Filed: Nov. 21, 2003

(65) Prior Publication Data

US 2004/0179720 A1 Sep. 16, 2004

Related U.S. Application Data

(60) Provisional application No. 60/454,315, filed on Mar. 14, 2003.

(51) Int. Cl.
*G06K 9/00* (2006.01)
*G06K 9/62* (2006.01)
*G06F 17/30* (2006.01)

(52) U.S. Cl. ............... 382/118; 382/209; 382/225; 707/3

(58) Field of Classification Search ............... 382/118, 382/209, 218, 225, 226, 228, 305; 707/3, 707/7
See application file for complete search history.

(56) References Cited

U.S. PATENT DOCUMENTS

| 5,802,361 | A | * | 9/1998 | Wang et al. ............... 382/217 |
| 5,819,288 | A | * | 10/1998 | De Bonet ...................... 707/2 |
| 5,852,823 | A | * | 12/1998 | De Bonet ...................... 707/6 |
| 6,564,225 | B1 | * | 5/2003 | Brogliatti et al. ........ 707/104.1 |
| 2002/0039447 | A1 | * | 4/2002 | Shniberg et al. ............ 382/224 |
| 2003/0086627 | A1 | * | 5/2003 | Berriss et al. .............. 382/305 |

* cited by examiner

*Primary Examiner*—Daniel Mariam
(74) *Attorney, Agent, or Firm*—24IP Law Group; Timothy R. DeWitt

(57) ABSTRACT

An architecture and method useful for fast one-to-many image matching and image indexing. A plurality of images in a database are digitized into a plurality of descriptors. The descriptors are separated into a plurality of index groups. Index values for the images in the database are then calculated for the various index groups. An index value, for example, could be calculated as the average of the descriptors in a particular group. A source groups of images having particular index values over a particular threshold value are identified. When matching a target image to images in the database, the index values are calculated for the target image and compared to the threshold value. Source groups of images having similar index values over the threshold are then identified for further matching to the target image.

17 Claims, 3 Drawing Sheets

IMAGE INDEXING SEARCH SYSTEM AND METHOD

CROSS-REFERENCE TO RELATED APPLICATIONS

This application claims the benefit of U.S. Provisional Application Serial No. 60/454,315 filed on Mar. 14, 2003 by inventors Tianlong Chen, Yi Rui, Yingbin Wang, and Yinong Wei.

Other related applications include the following:

Memory-Resident Database Management System and Implementation Thereof; U.S. patent application Ser. No. 10/347,678; Filed on Jan. 22, 2003; Inventors: Tianlong Chen, Jonathan Vu.

Distributed Memory Computing Environment and Implementation Thereof; U.S. patent application Ser. No. 10/347,677, Filed on Jan. 22, 2003; Inventors: Tianlong Chen, Jonathan Vu, Yingbin Wang.

Invariant Memory Page Pool and Implementation Thereof; U.S. patent application Ser. No. 10/425,730; Filed on Apr. 30, 2003; Inventors: Tianlong Chen, Yingbin Wang, Yinong Wei.

Central Linked List Data Structure and Methods of Use; Filed Jan. 7, 2002, U.S. patent application Ser. No. 10/346,260; Inventor: Jonathan Vu.

A Method and or System to Perform Automated Facial Recognition and Comparison Using Multiple 2D Facial Images Parsed from a Captured 3D Facial Image; U.S. Provisional Application No. 60/440,338 filed on Jan. 16, 2003; Inventors: Donald A. Milne, III and Jonathon Vu.

Method and Apparatus for Facial Identification Enhancement; U.S. patent application Ser. No. 10/635,565, filed on Aug. 5, 2003; Inventors: Tianlong Chen, Donald A. Milne, III, Yi Rui, Yingbin Wang, Jonathan Vu, And Yinong Wei.

Single Computer Distributed Computing Environment and Implementation Thereof; U.S. patent application Ser. No. 10/425,729; filed on Apr. 30, 2003; Inventors: Jonathon Vu, Tianlong Chen, Yingbin Wang, and Yinong Wei.

Integrated Portable Identification and Verification Device; U.S. patent application Ser. No. 10/635,516 filed on Aug. 5, 2003; Inventors: Donald Milne, III and Tianlong Chen.

The entirety of each of the aforementioned patent applications is incorporated by reference herein.

STATEMENT REGARDING FEDERALLY SPONSORED RESEARCH OR DEVELOPMENT

Not applicable.

FIELD OF THE INVENTION

The present invention relates to devices, systems, and processes useful for fast one-to-many image matching and more particularly to an indexing method to dramatically improve image matching processing and its implementation.

BACKGROUND OF THE INVENTION

Image processing has been advancing dramatically. One imaging process involves 'one-to-many' matching, i.e., given one image, this process finds its matches from an image archive or image database of a large number of images. In order to maintain acceptably high accuracy, many one-to-many image matching methods use the given image to one-by-one compare the given image to every image in the image database or archive. This process requires an expensive server or server cluster to achieve fast matching speed if the image database has a very large volume of images, such as more than 5 million images. The current industrial record for one-to-many matching is about one million comparisons per second.

SUMMARY OF THE INVENTION

One aspect of the present invention relates to a method which is capable of achieving high speed without sacrificing accuracy, and can be implemented with less expensive hardware than required with prior systems and methods. Theoretically, systems and methods according to the present invention can achieve high speeds, for example finding a set of 'top matches' of a given image (if any) from an image archive including up to billions of images in about one second.

Aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the architecture and method, given only by way of example, and with reference to the accompanying drawings, in which.

DESCRIPTION OF THE PREFERRED EMBODIMENTS

Figure 1:
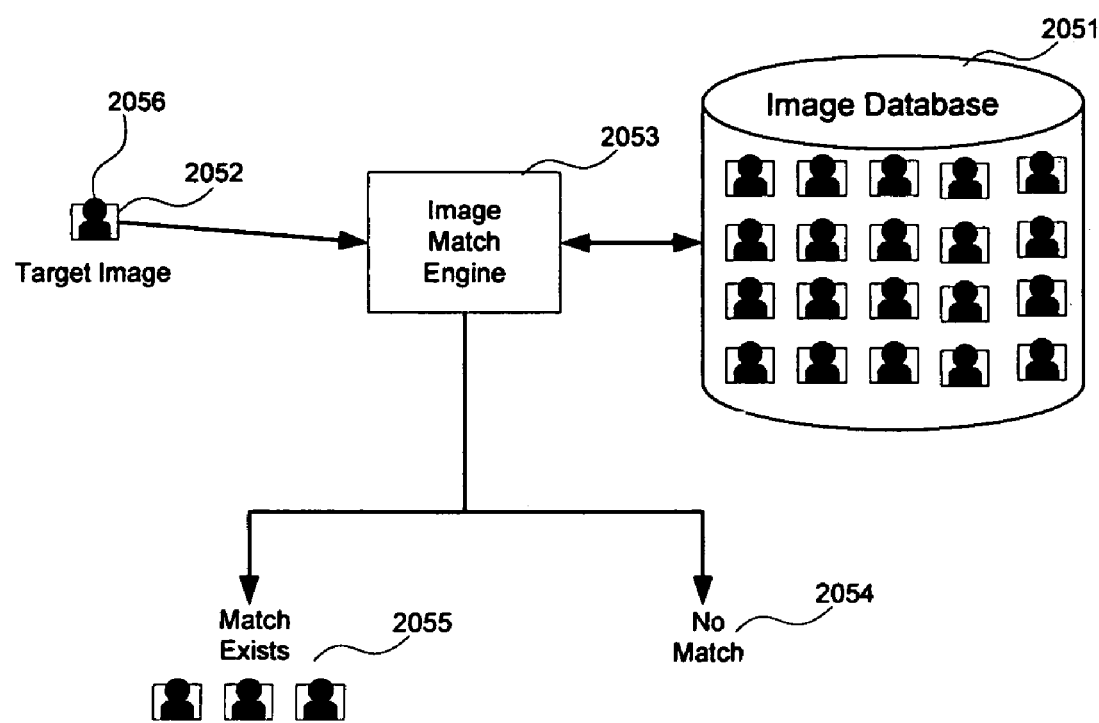
FIG. 1 illustrates a conceptual block diagram of an exemplary one-to-many image matching search.

The present invention relates generally to architectures and methods for fast one-to-many image matching. Another aspect of the present invention includes architectures and methods of image indexing. Accordingly, the drawings and descriptions are to be regarded as illustrative in nature, and not as restrictive.

The present invention is particularly useful when all of the images that are to be compared can be digitized into an array of roughly independent, and preferably entirely independent, descriptors (or called eigenvalues for certain digitization algorithms), and each descriptor may represent one feature of the targeted object (the object, such as a human face, is the matching target) in images. This is true for most currently used recognition algorithms, in particular facial recognition applications, such as various variations of Principal Component Analysis (PCA) based facial recognition algorithms, including those variations that have Local Feature Analysis (LFA) or combination of PCA and LFA. Examples of such algorithms include, but the present invention is not limited to: Hancock, P. R. Baddeley, and L. S. Smith (1992), "The principal components of natural images," Network: Computation in Neural Systems 3, 61–70; U.S. Pat. No. 5,164,992, Turk et al., "Face Recognition System"; and Kim, K. I., et al., "Facial Recognition Using Kernel Principal Component Analysis," IEEE Signal Processing Letters 9:2, pp. 40–42 (IEEE, February 2002). Those of skill in the art are familiar with facial image recognition algorithms, including facial image recognition algorithms, and their implementations in computer executable formats, and therefore further discussion of such algorithms is not included herein.

Referring to the drawing figures, like reference numerals designate identical or corresponding elements throughout the several figures.

Turning now to the drawing figures, and referring to FIG. 1, a first problem to which the present invention presents a solution, as embodied in the functionality of the exemplary Image Matching Engine 2053, is to find several 'top matches' of a given image 2052 ("target image"). One target object, such as a human face 2056, from the target image is sought in an image database 2051 ("source image database"; images in the "source image database" are "source images") of a large number of images, in which each image may have the targeted object. A match is defined when the targeted object exists in an image from the image database 2051 and is "similar" (meaning that it has similarity above a threshold of, e.g., a certain percentage) to the targeted object in the target image. If no match within the similarity threshold is found in a source image, then "No match" 2054 is returned as the result of the comparison. If multiple matches are found, then those matches 2055 with the highest similarity (called "top matches") are returned. The number of desirable top matches is configurable, for example, by changing the similarity threshold.

As an example of similarity or proximity of a match, assume that one image with a human face on it can be digitized into an array of 100 descriptors. If one image from the source image database has 80 descriptors out of 100 which are close enough, meaning that the absolute difference of each corresponding descriptor from the target image and a source image is smaller than a predefined value, then this source image is said to be of "80% similarity" to the target image. This can also be referred to as the similarity of the targeted object, such as a human face. The actual definitions of "similarity" or "proximity" of different matching algorithms can be different within the present invention, because the present invention is not limited to the specific matching algorithm utilized.

"Similarity" is defined and can be calculated, as will be readily appreciated by those of ordinary skill in the art, and all images can be digitized into an array of a certain number of descriptors, such that the descriptors are at least roughly independent of each other, and each descriptor may roughly correspond to one feature (such as a right eye, a left eye, nose, etc., of a human being) of the targeted object in the images. Even for those descriptors which are not completely independent of each other, the present invention is still applicable.

In order to achieve high speed one-to-many matching, architectures and methods of the present invention preferably pre-process all images and digitize them into arrays of descriptors. Thereafter, all the descriptors are loaded into computer system memory for further processing. Therefore, if the source image database is large, the system memory requirement will be huge. Another optional aspect of the present invention is the use of an Extended Memory Management Unit to exceed any limitation that the underlying Operating System may impose, as described in the aforementioned patent applications "Distributed Memory Computing Environment and Implementation Thereof" and "Memory-Resident Database Management System and Implementation Thereof", above.

Another aspect of the present invention is pre-separation of images into different groups based on the characteristics of the digitized descriptors of the images, and preferably only to conduct one-by-one matching searches in the qualified groups that have similarity in higher levels.

One observation in process image matching is that if the targeted human face from two images are from same person, a large percentage of the digitized descriptors from the two images are close to each other, meaning that the absolute differences of a large percentage of corresponding descriptors are less than a pre-selected small number.

Assume the number of descriptors from an image is M, the number of descriptors from the target image is Ai (with $1 \leq i \leq M$), the number of descriptors from the source image is Bi (with $1 \leq i \leq M$), and $\delta$ is a pre-selected small positive number. Then, if two images are similar, the following equation holds for a large percentage of descriptors from the two images, $$|Ai - Bi| < \delta \quad (1)$$

As discussed above, the "difference" can be defined differently for different matching algorithms; however, equation (1) holds essentially true for most matching algorithms with independent or roughly independent descriptors, and each descriptor corresponds to one feature of the targeted object, e.g., a human face.

Another observation from matching algorithms found by the present inventors is that the average value of a group of selected descriptors have a similar equation for two "similar" images, as below:

$$\left| \frac{\sum_i A_i}{x} - \frac{\sum_i B_i}{x} \right| < \delta \quad (2)$$

where 'i' are indexes of selected descriptors, $\delta$ is a pre-selected small positive number, and X is the number of selected descriptors in a group.

The present inventors have found that a one-to-many matching algorithm can achieve a speed of one million matchings per second on a 2.4 GHz P4 (Pentium™ 4, Intel) server; therefore, the algorithm can finish a one-to-35,000 image matching (actually, 35,000 one-to-one matchings) in 35 milliseconds using entirely system memory-based matching. With more sophisticated and complicated matching algorithms, a one-to-35,000 image matching can be finished faster yet, for example in less than 35 milliseconds. However, if the image database is of millions of images, the matching speed will be long, and furthermore may require large system memory.

According to the present invention, however, image indexing can be used to select images with high similarity, from millions or even billions of images, in short time periods, e.g., 500 milliseconds, for fine one-to-one matching, and limit the final one-to-one matching to about a small number of images, e.g., 35,000 images. This is because it has already been established that this latter comparison can be finished in about 500 milliseconds, and thus the whole matching process can still be finished in a short time period, e.g., one second. Of course, these time values are dependent on processing speed and other parameters, as well known to those of skill in the art, and the present invention is not limited to these values. As also well known to those of skill in the art, an indexing process in a database is a relatively fast process, provided that the indexing method is good, and thus the present invention is capable of achieving one to up-to-billions image matching searching with reasonably high accuracy in one second on a readily commercially available regular powerful server, without requiring the use of a supercomputer.

Figure 2:
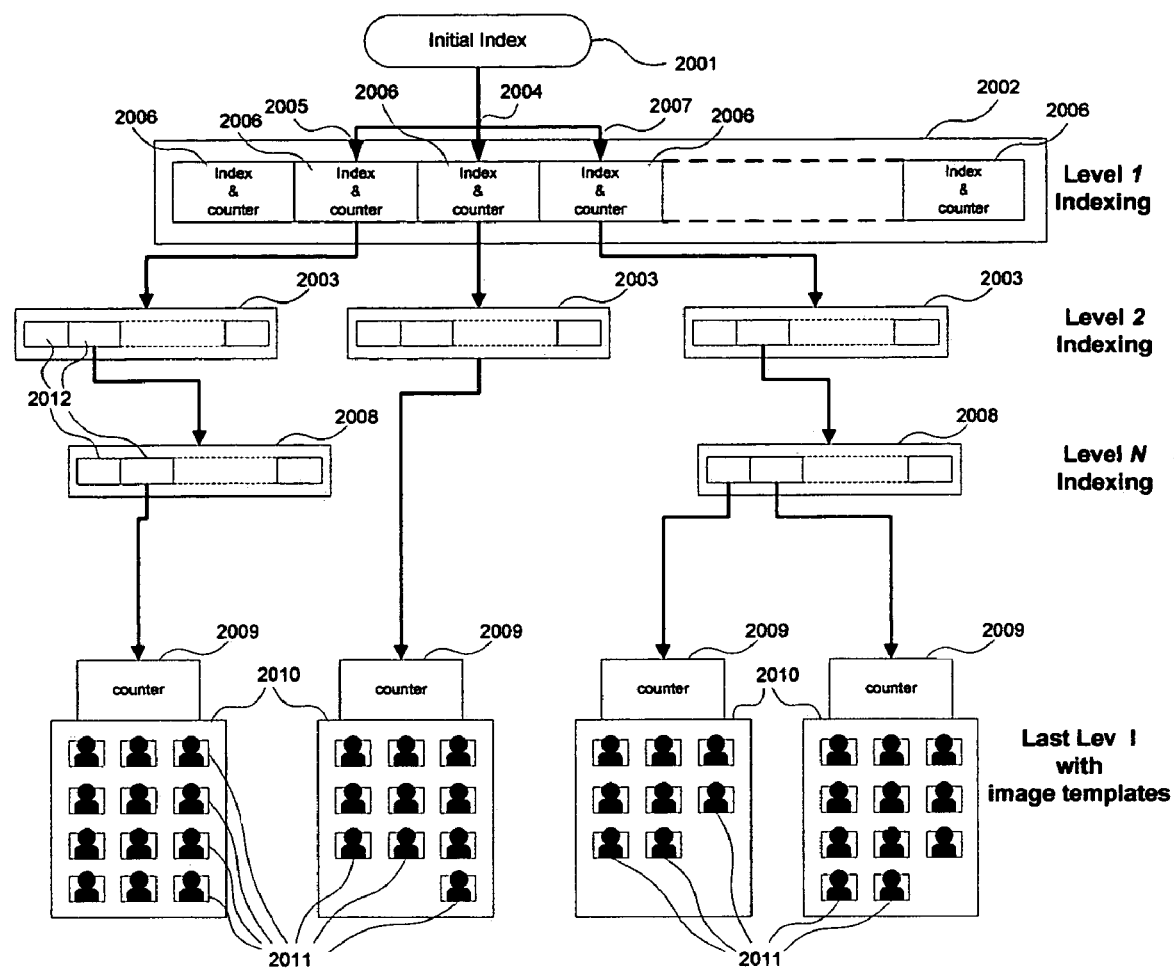
FIG. 2 illustrates a conceptual block diagram of an embodiment of an exemplary one-to-many image indexing matching architecture.

Referring to FIG. 2, benefiting from the above observations, one aspect of the present invention includes an indexing image matching search architecture capable of achieving one-to-billion image matching with reasonably high accuracy.

For ease of explanation, facial recognition matching algorithms will be used herein as an example for description of the invention. As will be readily appreciated by those of skill in the art, the present invention is not limited to facial recognition, and applies equally to other image types. Current facial recognition algorithms are mostly based on various variations of PCA (Principal Component Analysis), which represent human face features with eigenvalues or descriptors. The number of descriptors typically ranges from about 40 up to several thousands. Two similar faces have a high percentage of corresponding descriptors close to each other, as discussed above.

In a simple case, each descriptor is chosen as one index in the image matching search. However, there are two reasons for normally not choosing each descriptor as an index: the number of indexes will become too large and degrade the speed of indexing; and, the noise in each image can result in unusual fluctuation of descriptor value.

Figure 3:
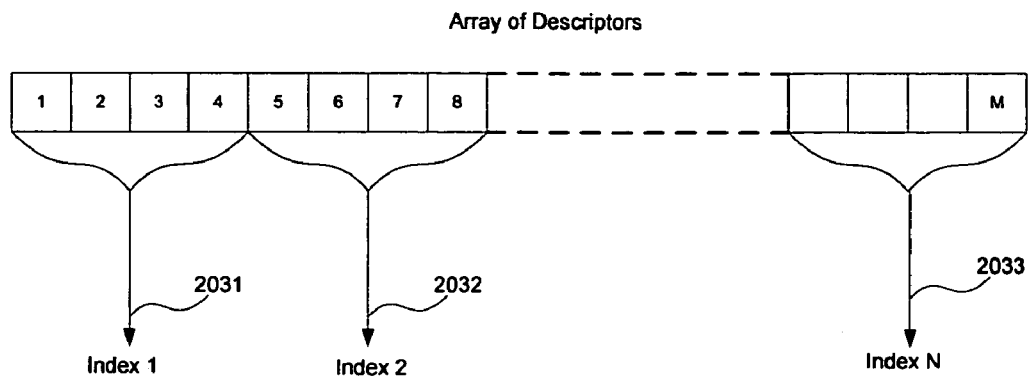
FIG. 3 illustrates a conceptual block diagram of an exemplary embodiment of image indexing method.
Figure 4:
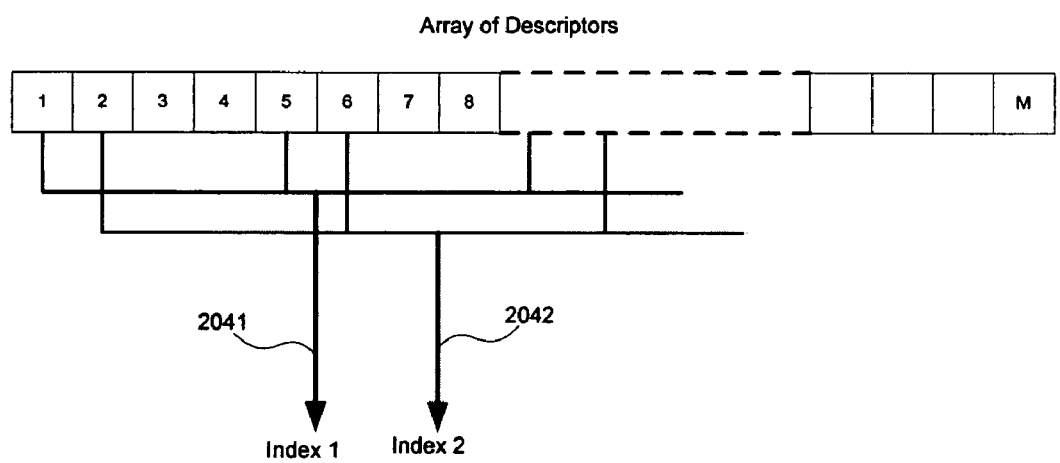
FIG. 4 illustrates a conceptual block diagram of another exemplary embodiment of image indexing method.

The above equation (2) provides a method of indexing, using the average value of a group of selected descriptors as index, as illustrated in FIGS. 3 and 4 as examples. In FIG. 3, the average value of every four consecutive descriptors is selected as one index 2031, 2032, and 2033, resulting in N=M/4 indexes, when M is the number of all descriptors. In FIG. 4, the average value of every fourth descriptor is selected as an index 2041, 2042, resulting in a total of four indexes. As these two examples illustrate, the number of descriptors in a group is configurable, and the number should be selected to be able to separate images as evenly distributed as possible, and the number of index levels is reasonable. Those of skill in the art will appreciate that the present invention is not restricted to these exemplary descriptor indexing methods.

Some current image matching algorithms use a floating point number for the descriptor; in the present invention, this is preferably normalized into a range of [0, 1], then multiplied by 65535, resulting in the descriptors being on the range of [0, 65535]. As will be readily appreciated by those of skill in the art, the above range is provided merely by example, and other ranges, smaller or larger, can be used without departing from the present invention. This range is preferable, although not necessary, for hash-based indexing.

Turning back to the drawing figures, assuming the number of final fine one-to-one matching is selected to be a value F, FIG. 2 illustrates a block diagram of an exemplary indexing matching architecture in accordance with the present invention. Before matching can proceed, the hierarchical indexing hashing tables are built. All images in the source image database are digitized, then the index values are pre-calculated as described above for index groups, for each image. Then, one index group is selected as the level 1 index, and a hash table 2002 is built of, e.g., 65536 (depending on the descriptor value, as discussed above) hash buckets, such that each possible index value of the level 1 index will be indexed to one of the hash buckets. Each hash bucket includes one counter that is the sum of the numbers of the underlying linked images. Then each source image is first hashed into the level 1 index hash table 2002.

When one image descriptor is hashed into one hash bucket 2006, the associated counter will increase by one. This process is repeated until all the images are inserted into the level 1 index hash table 2002. After the level 1 index hash table 2002 is finished, the process loops through each hash bucket of the level 1 hash table 2002 and checks the counters: any hash bucket 2006 with its counter value larger than value F is subject to further indexing. Then the second level index hash table 2003 can be built within those buckets which have counters larger than the value F in the level 1 hash table, by using the level 2 index. This is repeated, either until the level N indexing hash table 2008 (for a total N index groups) is reached, or no single hash bucket in any indexing level has its counter larger than the value F. Those index levels with counter values less than the value F include the actual linked list (or array) 2010 of images 2011.

Further preferably, the index group should be picked such that a hierarchical indexing hash tree can be built such that any hash bucket in any indexing level has its counter less than or equal to the value F, so that the number of final fine one-to-one matching is limited to about value F. As discussed above, this can result in finishing the matching process within a desirable time, such as 500 millisecond.

Still referring to FIG. 2, for the given target image, the index values are calculated as done for the source images. The level 1 index of the target image is used as an Initial Index 2001 to index 2004 ("center index", in this level) into one hash bucket 2006 of the level 1 index hash table 2002. If the counter is smaller than the value F, then the neighboring two hash buckets 2005, 2007 are selected. If the sum of the counters from 2004 and its neighbors 2005, 2007 is still smaller than the value F, further neighbors are picked until the sum of all picked hash bucket counters are about the value F (the sum may be slightly larger or smaller than the value F).

Alternatively, when the counter at the center index 2004 is larger than the value F, then no additional neighbors of 2004 are picked, and the process proceeds to level 2 indexing 2003 for further refinement using the level 2 index from the target image to index into the level 2 index hash table 2003. Steps similar to those described above with respect to the level 1 indexing hash table 2002 are performed until an indexing level is found such that the center index and its neighbors has a counter sum approximately that of the value F. Then all image descriptors 2011 in those picked hash buckets 2009 are subject to a final, fine one-to-one matching search. If the second index level still does not have a center index with a counter smaller than the value F, then the process is continued for additional levels until a level is reached in which the hit center index has its counter smaller than the value F.

The foregoing example shows that the indexing value is calculated by averaging values of descriptors in a group. The present invention is not limited to this specific methodology. Without departing from the scope of the present invention, numerous other methodologies can be utilized, for example an average of square values of descriptors in an index group, neural network indexing or any other indexing values based on characteristics of matching algorithms.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for indexing a plurality of images in a database, each image in said database having within it an object of the same type, comprising the steps of:
   digitizing each of said plurality of images in said database into an array of descriptors;
   separating said descriptors into a plurality of index groups;
   calculating for at least one of said plurality of images in said database an index value corresponding to one of said index groups:
   providing a first index level, a second index level, and a pre-set number:
   wherein said first index level has a first index value, said second index level has a second index value, said first index level having a first list of buckets, said second index level having a second list of buckets, and said buckets each hay inn a counter:
   if said counter of a bucket in said first index level is lamer than said pre-set number, then said bucket in said first index level has a second index level, and said counter is the sum of counters of said buckets in said second index level;
   if said counter of said bucket in said first index level is less than or equal to said pre-set number, then said bucket in said first index level has a list of image templates, and the number of said image templates is said counter;
   wherein each said image template comprises a plurality of said descriptors.

2. A method for indexing a plurality of images in a database according to claim 1 wherein said index value is a function of at least two of said descriptors.

3. A method for indexing a plurality of images in a database according to claim 2 wherein said function comprises averaging at least two of said descriptors.

4. A method for indexing a plurality of images in a database according to claim 2 wherein said function comprises averaging four of said descriptors.

5. A method in accordance with claim 1, wherein said object type comprises a human face.

6. A method according to claim 1, wherein said second index level comprises a hash table said index value as a hash value.

7. A method for image indexing comprising:
   digitizing a target image having an object within it into an array of descriptors;
   digitizing at least one source image in a database into an array of descriptors, each said source imaging having an object within it and said object in said target image and said object in said at least one source image being of same type;
   wherein said array of descriptors from said target image and said array of descriptors from said at least one source image comprise the same type and the same number of descriptors; and
   separating said descriptors into index groups, wherein said index groups each have an index values;
   providing a first index level, a second index level, and a pre-set number;
   wherein said first index level has a first index value, said second index level has a second index value, said first index level having a first list of buckets, said second index level having a second list of buckets, and said buckets each having a counter;
   if said counter of a bucket in said first index level is larger than said pre-set number, then said bucket in said first index level has a second index level, and said counter is the sum of counters of said buckets in said second index lever;
   if said counter of said bucket in said first index level is less than or equal to said pre-set number, then said bucket in said first index level has a list of image templates, and the number of said image templates is said counter;
   wherein each said image template comprises a plurality of said descriptors.

8. A method in accordance with claim 7, wherein said object type comprises a human face.

9. A method according to claim 7, wherein said index value of each index group is the average value of said descriptors in said index group.

10. A method according to claim 7, wherein each said index group comprises a consecutive number Y of said descriptors.

11. A method according to claim 10, further comprising the step of selecting Y.

12. A method according to claim 7, wherein said index group comprises every other Z descriptors, wherein Z is an integer.

13. A method according to claim 12, further comprising the step of selecting Z.

14. A method of image indexing for an image database having a plurality of image templates generated from a plurality of source images, comprising:
   providing hierarchical multiple index levels, and a pre-set number;
   wherein each said index level has a list of buckets, said buckets each having an index value and each having a counter;
   if a counter of a bucket in a first index level in said multiple index levels is larger than said pre-set number, then said bucket in said first index level has a second index level, and said counter of said bucket in said first index level is the sum of counters of said buckets in said second index level;
   if said counter of said bucket in said first index level in said multiple index levels is less than or equal to said pre-set number, then said bucket in said first index level has a portion of said plurality of image templates, and the number of said image templates is the said counter of said bucket; said portion of said plurality of image templates each having an index value matching to said index value of said bucket.

15. A method according to claim 14, wherein each of said multiple index levels comprises a hash table using said index value as a hash value.

16. A method of finding top matches from an image database having source images, given a target image, and using image indexing architecture with a one-by-one matching algorithm, and a pre-set percentage threshold for similarity matching for said matching algorithm, said method comprising:
   setting a pre-set number as an upper limit for the number of final one-to-one matching groups of templates for final fine-matching using said one-by-one matching algorithm;
   constructing said image indexing architecture, said constructing step comprising;
   providing hierarchical multiple index levels, and a pre-set number;

wherein each said index level has a list of buckets, said buckets each having an index value and each having a counter;

if a counter of a bucket in a first index level in said multiple index levels is larger than said pre-set number, then said bucket in said first index level has a second index level, and said counter of said bucket in said first index level is the sum of counters of said buckets in said second index level;

if said counter of said bucket in said first index level in said multiple index levels is less than or equal to said pre-set number, then said bucket in said first index level has a portion of said plurality of image templates, and the number of said image templates is the said counter of said bucket; said portion of said plurality of image templates each having an index value matching to said index value of said bucket;

digitizing said target image into a target image template;

calculating a group of index values of said target image template;

using said group of index values of said target image template to create a final one-by-one matching group of image templates from said image indexing architecture for final fine-matching, comprising the steps of:

using a first index value from said group of index values of said target image template to index into one index level of said hierarchical multiple index levels in said image index architecture; using said first index of said target image template to index into said first index level of said image indexing architecture:

if a counter of a bucket of a first index level is larger than or equal to said pre-set number, then using a next index of said target image template to index into a next index level of said image indexing architecture until a bucket having a counter less than said pre-set value is found or a bucket having a last index level is reached;

if a last index level is reached, image templates contained under said bucket having said last index level from said final one-by-one matching group; and if the counter of a bucket of an index level is less than said pre-set number, then picking said bucket and neighboring buckets in said first index level until the sum of the counters of said neighboring buckets is larger than or equal to said pre-set number; and all portions of image templates contained under said neighboring buckets from said final one-by-one matching group;

thereafter applying said one-by-one matching algorithm to said target image and each of said source images templates of said final one-by-one matching group; wherein source image templates having the highest matching scores from said final one-by-one matching group against the target image template with said matching scores over said pre-set percentage threshold become said top matches.

17. A method according to claim 16, wherein said matching algorithm provides a list of matches with higher than said pre-set percentage threshold, or gives no match if there are no matches with higher than said pre-set percentage threshold.

* * * * *

UNITED STATES PATENT AND TRADEMARK OFFICE
CERTIFICATE OF CORRECTION

| | |
|---|---|
| PATENT NO. | : 7,184,577 B2 |
| APPLICATION NO. | : 10/718738 |
| DATED | : February 27, 2007 |
| INVENTOR(S) | : Chen et al. |

It is certified that error appears in the above-identified patent and that said Letters Patent is hereby corrected as shown below:

Col. 7,
Line 20, change "hay inn" to --having--

Col. 7,
line 21, change "lamer" to --larger--

Signed and Sealed this

Eighth Day of May, 2007

JON W. DUDAS
*Director of the United States Patent and Trademark Office*